United States Patent Office 3,466,265
Patented Sept. 9, 1969

3,466,265
PROCESSES FOR PREPARING ETHYLENE COPOLYMERS
Richard L. Alexander, Greensburg, Ind., Harry D. Anspon, Kansas City, Mo., and Francis E. Brown, Orange, Tex., assignors to Gulf Research & Development Company, Pittsburgh, Pa., a corporation of Delaware
No Drawing. Filed Sept. 21, 1966, Ser. No. 580,853
Int. Cl. C08f 1/80, 1/06, 15/16
U.S. Cl. 260—78.5                                           8 Claims

ABSTRACT OF THE DISCLOSURE

Copolymers of ethylene and lower alkyl fumarates and maleates are prepared in a continuous high pressure free radical catalyst initiated process. Explosive decompositions are prevented by introducing a hindered phenol into the polymerization reactor.

---

This invention relates to processes for preparing copolymers of ethylene.

More specifically, the invention relates to processes for preparing copolymers of ethylene and loweralkyl fumarates and maleates which are useful in the preparation of various films, molded articles, polymeric emulsions and the like.

In a particular aspect, the invention concerns continuous processes for preparing copolymers of ethylene and di-loweralkyl fumarates and maleates.

The preparation of copolymers of ethylene and, as a comonomer, either a di-loweralkyl fumarate or maleate is known.

Although such copolymers are conveniently prepared batchwise by charging the comonomers, catalyst and such modifiers as desired, their preparation by a continuous autoclave process has not heretofore been possible on a commercial scale due to operating difficulties stemming from the tendency of the polymerization mixture to form "super molecules" which are insoluble in the polymerization mixture. Super molecules are formed as a result of a phenomenon known in the art as "intramolecular transfer."

The formation of super molecules through intramolecular transfer leads to explosive decompositions of the polymerization mixture after the continuous process has been operated for only relatively short periods of time. Hence, the continuous process, though highly desired as a convenient, economically feasible and a practical commercial technique, has been unobtainable in practice.

Accordingly, it would be highly desirable to provide a convenient, economically feasible, practical process wherein copolymers of ethylene with dialkyl fumarates or dialkyl maleates can be continuously prepared. Furthermore, it would be highly advantageous if the techniques of the familiar so-called "high pressure," free-radical initiated polymerization process such as is commonly employed in the production of ethylene homopolymers could be effectively utilized to prepare the copolymers contemplated herein.

We have now discovered that the aforestated objectives can be achieved and that copolymers of ethylene with either dialkyl fumarates or dialkyl maleates can be effectively, conveniently, feasibly and practically prepared on a commercial basis in a continuous process. Furthermore, we have discovered that the general techniques employed in the so-called high pressure, free-radical initiated ethylene homopolymerization process can be applied successfully to the production of these copolymers if certain procedures are followed. Additionally, we have discovered a method for preventing explosive decompositions in such processes to the extent that they can be successfully practiced commercially.

Briefly, according to our invention, we provide in a process for preparing copolymers of ethylene and a comonomer comprising a member of the class consisting of alkyl fumarates and alkyl maleates including contacting a polymerization mixture comprising ethylene, the comonomer and a free radical generating polymerization initiator in a polymerization zone at a polymerizing temperature and under a polymerizing pressure, and thereafter separating the copolymer from the polymerization mixture, the improvement in the process whereby continuous operation is made possible comprising the step of effecting the polymerization in the presence of an additive compound selected from the class consisting of nuclearly-substituted phenols, biphenols and bisphenols wherein each phenolic nucleus has at least one substituent selected from the class consisting of hydroxy, carboxyl, carbonyl, nitro, amino, aminoalkyl, alkylamino, alkyl alkenyl, alkoxy and alkacyl groups.

The process of the present invention has been most advantageously applied to the preparation of copolymers of ethylene with dialkyl fumarates, especially diethyl fumarate, and dialkyl maleates, especially diethyl maleate.

In general, one employs techniques similar to the techniques of the so-called high pressure, free-radical initiated ethylene homopolymerization process in preparing the copolymers contemplated herein including maintaining the pressure in the polymerization zone at from about 10,000 to about 50,000 p.s.i.g., typically and preferably at from about 15,000–20,000 p.s.i.g., and maintaining the temperature within the polymerization zone at from about 200–400° F., the specific temperature and pressure to be employed being dependent somewhat upon the specific properties of the copolymer desired and the particular polymerization initiator employed.

We prefer to employ a free-radical generating polymerization initiator having a relatively short half-life in comparison to the initiators commonly employed in many prior art polymerization processes. Thus, suitable initiators which may be employed have half-lives of from about 5 to about 50 minutes and desirably from about 20 to about 40 minutes at 185° F. as determined by the method of Doehnert and Mageli, Modern Plastics 36, 142 (February 1959). For example, Table A lists several of the initiators which are preferred in the practice of the present invention.

TABLE A

| Initiator: | Half-lift at 185° F., minutes |
|---|---|
| Lauroyl peroxide | 30 |
| Decanoyl peroxide | 30 |
| Caprylyl peroxide | 30 |
| Tertiarybutylperoxypivalate | 25–30 |
| α,α'-Azobisisobutyronitrile | 40 |

In contrast to the initiators employed in the practice of the present invention, initiators such as ditertiary butyl peroxide, tertiary butyl peracetate and tertiary butyl perbenzoate which are commonly employed in prior art ethylene homopolymerization processes, have a half-life at 212° F. of 218 hours, 18 hours and 17 hours, respectively. The initiators employed herein are introduced into the polymerization zone in any suitable manner, for example, by dissolving the initiator in a suitable solvent and injecting the initiator solution directly into the polymerization zone. Alternatively, the initiator may be injected into the feed stream, either into the ethylene feed stream or the comonomer feed stream, prior to introduction thereof into the polymerization zone.

The polymerization mixture comprising ethylene and an appropriate quantity of the comonomer is contacted in the polymerization zone with the free-radical generating initiator in the presence of the aforementioned additive compound. The additive compound may be injected directly into the reactor as suitable distribution of the additive compound throughout the polymerization mixture can be achieved in this manner. Alternatively, the additive compound may be pre-mixed with the initiator, if separately injected, or with either the ethylene or the comonomer feed streams. Thus, it is not essential in the practice of the present invention that the additive compound be introduced in any particular manner so long as a concentration of the additive compound sufficient to prevent substantial danger of explosive decomposition is continuously maintained in the polymerization mixture. Generally it is preferred to begin injection of the additive compound prior to the time the reactor is "lit off."

The exact amount of additive compound required in order to prevent explosive decompositions during the continuous copolymerization reaction will vary somewhat in accordance with the specific type of comonomer involved, the ratio of comonomer to ethylene employed and, to a degree, upon the specific conditions of pressure and temperature selected. In general, an amount of from about 0.0005 to about 0.00018 mol of additive compound per mol of feed to the polymerization zone (ethylene plus comonomer) is sufficient and effective to substantially prevent explosive decompositions. Suitable specific amounts of additive compound may be established by routine simple experimentation by persons having ordinary skill in the art for any specific set of polymerization conditions having regard for the invention herein disclosed.

According to a presently preferred embodiment of the invention, we employ as the additive compound a compound comprising a 2,4,6-triloweralkyl phenol. Of this class the compounds 2,6-ditetriarybutyl-4-ethyl phenol and 2,6-ditetiarybutyl-4-methyl phenol and especially preferred, the former compound being used to advantage where color stability of the copolymer is desired. However, many other compounds are effectively employed in practicing the present invention. A partial list of such compounds which may be used with appropriate adjustment in quantities and other process parameters is found in Table B.

TABLE B parahydroxybenzaldehyde
hydroquinone monomethyl ether
p-amino phenol
3,5 xylenol
2,6 diisopropyl phenol
3,5 ditertiarybutyl-4-hydroxy benzyl ether
1,3,5-trimethyl-2,4,6-tris(3,5-ditertiarybutyl-4 hydroxy benzyl) benzene
2,6-dioctadecyl-paracresol
2 tertiary butyl hydroxy anisole
4-hydroxymethyl-2,6-ditertiarybutyl phenol
4-tertiary-butyl pyrocatechol
2,5-ditertiaryamyl hydroquinone
4,4'-thiobis-(6-tertiarybutyl-meta-cresol)
2,2'-ethylenebis (4-methyl-6-tertiarybutyl phenol)
4,4'-methylenebis (6-tertiarybutyl-ortho-cresol)
4,4'-methylenebis (2,6-ditertiarybutyl phenol)
2,4,6-tri-tertiarybutyl phenol The following examples are presented to more clearly illustrate the present invention and the preferred embodiments thereof.

Example 1

Feed streams comprising ethylene (1,362 gram moles per hour), containing 2,6-ditertiarybutyl-4-methyl phenol (0.118 gram moles per hour), and diethyl fumarate (9.6 gram moles per hour) are continuously introduced into a stirred autoclave-type reactor and mixed therein with a decanoyl peroxide initiator (0.109 gram moles per hour) to form a polymerization mixture which is maintained at a pressure of 15,800 p.s.i.g. The polymerization temperature, measured by a thermocouple positioned at the confluence of the feed streams, was maintained at 350° F. by adjusting the rate of initiator introduced. A mixture comprising ethylene-diethyl fumarate copolymer, unreacted ethylene and a small amount of comonomer was continuously withdrawn from the autoclave at a rate substantially equal to the combined feed rates. The ethylene-diethyl fumarate copolymer was produced at a rate of 10.5 lbs. per hour and after purification of comonomer contained 7.77 mol percent copolymerized diethyl fumarate. The copolymer product produced as described above had an inherent viscosity of 0.30, 2% crystallinity determined by Differential Thermal Analysis, and a density of 0.9613. The diethyl fumarate copolymer exhibited an unexpected and unusually high reactivity, 98.5% of the diethyl fumarate being copolymerized during the run.

The above described continuous copolymerization process was continued for 5 hours during which no explosive decompositions occurred. After termination of the run, visual inspection of the autoclave and associated equipment revealed that no substantial quantity of insoluble super polymer was made during the course of the run.

Example 2

The procedures of Example 1 are repeated except that the comonomer is diethyl maleate rather than diethyl fumarate and except that the polymerization temperature is maintained at 363° F. The diethyl maleate comonomer is fed to the reactor at a rate of 0.61 mol percent of the total ethylene-diethyl maleate fed. The additive 2,6-ditertiarybutyl-4-methyl phenol is injected into the feed stream at a rate of 0.085 gram mole per hour.

The ethylene-diethyl maleate copolymer contained 21% by weight diethyl maleate copolymerized therein and had an inherent viscosity of 0.339, a density of 0.9517, and a melt index of 1,208.

The continuous process of Example 2 was carried out for approximately 5 hours during which no explosive decompositions occurred. Visual inspection of the autoclave at the conclusion of the run revealed some buildup of super polymer at the top of the reactor, but this was an insufficient amount to cause any difficulties.

Having fully described our invention and the presently preferred practice thereof, we claim:

1. In a continuous process for preparing copolymers of ethylene and a comonomer selected from the class consisting of alkyl fumarates and alkyl maleates including the steps of continuously introducing ethylene and said comonomer into a polymerization zone, forming a polymerization mixture of said ethylene and said comonomer, contacting said polymerization mixture with a free radical generating polymerization initiator, maintaining a polymerizing pressure within said zone at from about 10,000 to about 25,000 p.s.i.g., maintaining a polymerizing temperature within said zone of from about 200 to about 400° F., continuously withdrawing from said zone a mixture comprising said copolymer, unreacted comonomer and unreacted ethylene, and separating said copolymer from said withdrawn mixture, the improvement in said process whereby said process can be continuously practiced without substantial danger of explosive decomposition, said improvement comprising in combination with said process the step of maintaining in said polymerization mixture in an amount sufficient to prevent substantial danger of explosive decomposition an additive compound selected from the class consisting of hindered nuclearly-substituted phenols, biphenols and bisphenols wherein each phenolic nucleus has at least one substituent selected from the class consisting of hydroxy, carboxyl, carbonyl, nitro, amino, aminoalkyl, alkylamino, alkyl, alkenyl, alkoxy and alkacyl groups.

2. Process of claim 1 wherein said comonomer is diethyl fumarate.

3. Process of claim 1 wherein said comonomer is diethyl maleate.

4. In a continuous process for preparing copolymers of ethylene and a comonomer selected from the class consisting of di-loweralkyl fumarates and di-loweralkyl maleates including the steps of continuously introducing ethylene and said comonomer into a polymerization zone, forming a polymerization mixture of said ethylene and said comonomer, continuously contacting said polymerization mixture with a free radical generating polymerization initiator having a half-life of from about 5 to about 50 minutes at 185° F., maintaining a polymerizing pressure within said zone at from about 15,000–20,000 p.s.i.g., maintaining a polymerizing temperature within said zone of from about 200–400° F., continuously withdrawing from said zone a mixture comprising said copolymer, unreacted comonomer, if any, and unreacted ethylene, separating said copolymer from said withdrawn mixture, and recycling said unreacted comonomer, if any, and unreacted ethylene to the polymerization zone, the improvement in said process whereby said process can be continuously practiced without substantial danger of explosive decomposition, said improvement comprising in combination with said process the step of maintaining in said polymerization mixture in an amount sufficient to prevent substantial danger of explosive decomposition an additive compound comprising a 2,4,6-triloweralkyl phenol.

5. Process of claim 4 wherein said additive compound is 2,6-ditertiarybutyl-4-methyl phenol.

6. Process of claim 4 wherein said additive compound is 2,6-ditertiarybutyl-4-ethyl phenol.

7. Process of claim 4 wherein said comonomer is diethyl fumarate.

8. Process of claim 4 wherein said comonomer is diethyl maleate.

References Cited

UNITED STATES PATENTS

| | | | |
|---|---|---|---|
| 2,497,323 | 2/1950 | Roedel | 260—94.9 |
| 3,377,330 | 4/1968 | Mortimer | 260—94.9 |
| 3,412,178 | 11/1968 | Brown | 260—88.1 |

JOSEPH L. SCHOFER, Primary Examiner

JOHN KIGHT III, Assistant Examiner